United States Patent [19]

Elder

[11] Patent Number: 4,998,627

[45] Date of Patent: Mar. 12, 1991

[54] LID HOLDER RACK

[76] Inventor: Marlene K. Elder, 7444 Covey Rd., Forestville, Calif. 95436

[21] Appl. No.: 484,979

[22] Filed: Feb. 26, 1990

[51] Int. Cl.⁵ ............................................. A47F 5/00
[52] U.S. Cl. ...................................... 211/13; 211/41; 211/87
[58] Field of Search ................. 211/13, 41, 71, 87, 211/89, 106

[56] References Cited

U.S. PATENT DOCUMENTS

| | | | |
|---|---|---|---|
| 1,192,965 | 8/1916 | White | 211/41 X |
| 1,309,608 | 7/1919 | Bonner | 211/41 |
| 1,528,744 | 3/1925 | Dix | 211/41 |
| 1,787,587 | 1/1931 | Miller | 211/87 |
| 1,986,486 | 1/1935 | Swanson | 211/41 |
| 2,099,507 | 11/1937 | Wright | 211/106 |
| 2,964,196 | 12/1960 | Phillips | 211/13 |
| 3,094,215 | 6/1963 | Sipe | 211/13 |
| 4,832,206 | 5/1989 | Cunningham | 211/41 |

Primary Examiner—Robert W. Gibson, Jr.
Attorney, Agent, or Firm—Leon Gilden

[57] ABSTRACT

A lid holder rack is set forth for securement in orthogonal relationship relative to a vertical support surface, such as a cabinet structure. The lid holder rack includes a forward support bar with a plurality of "V" shaped notches formed therein and spaced by a plurality of side legs from the vertical cabinet structure a distance equal to or greater than a height defined by an included lid. Alternative embodiments include a wire frame body and a series of racks formed between spaced legs. A further embodiment includes an elastomeric band to secure and maintain in industrial relationship positioned against a rear surface of the forward support bar.

3 Claims, 6 Drawing Sheets

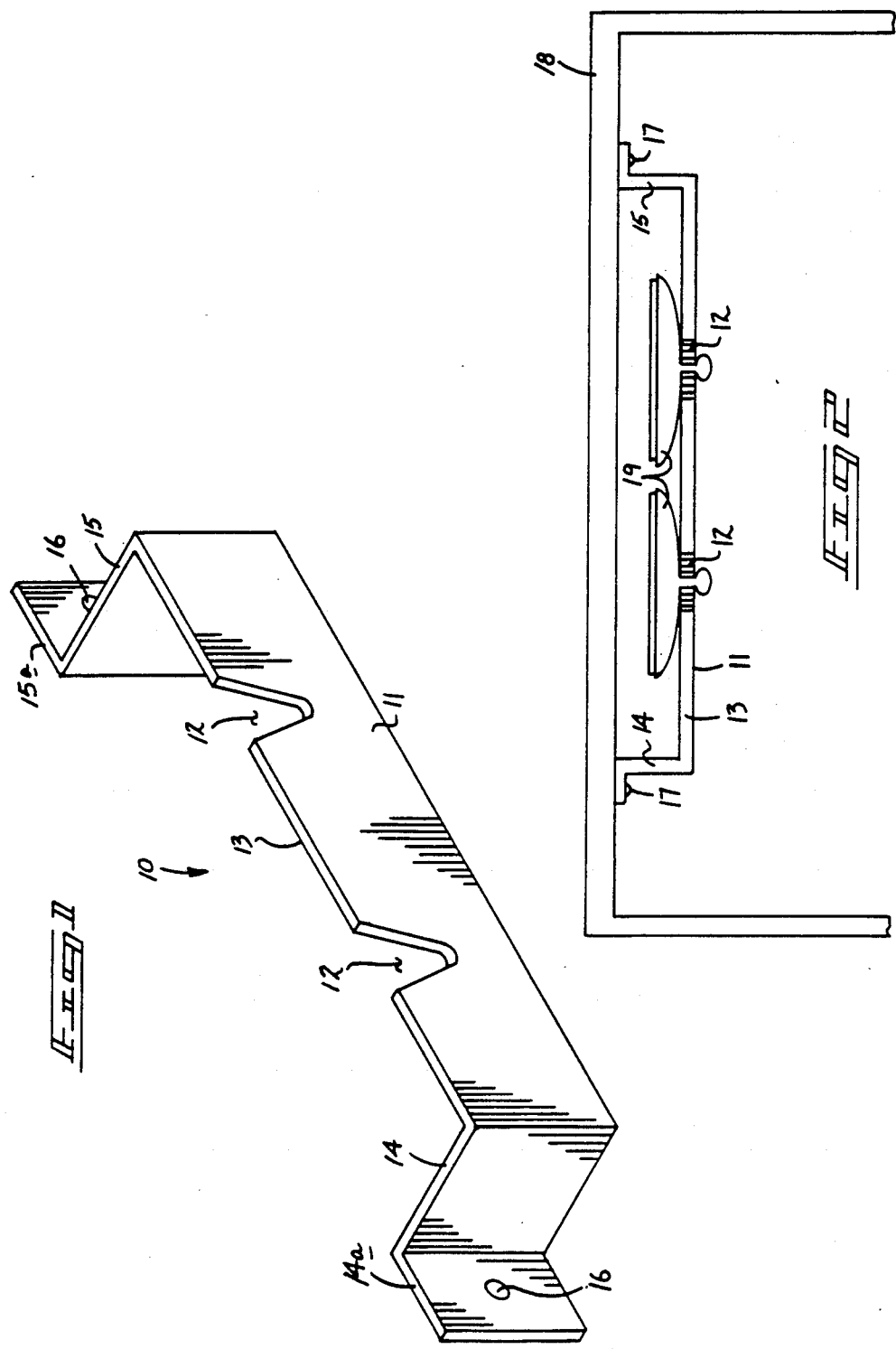

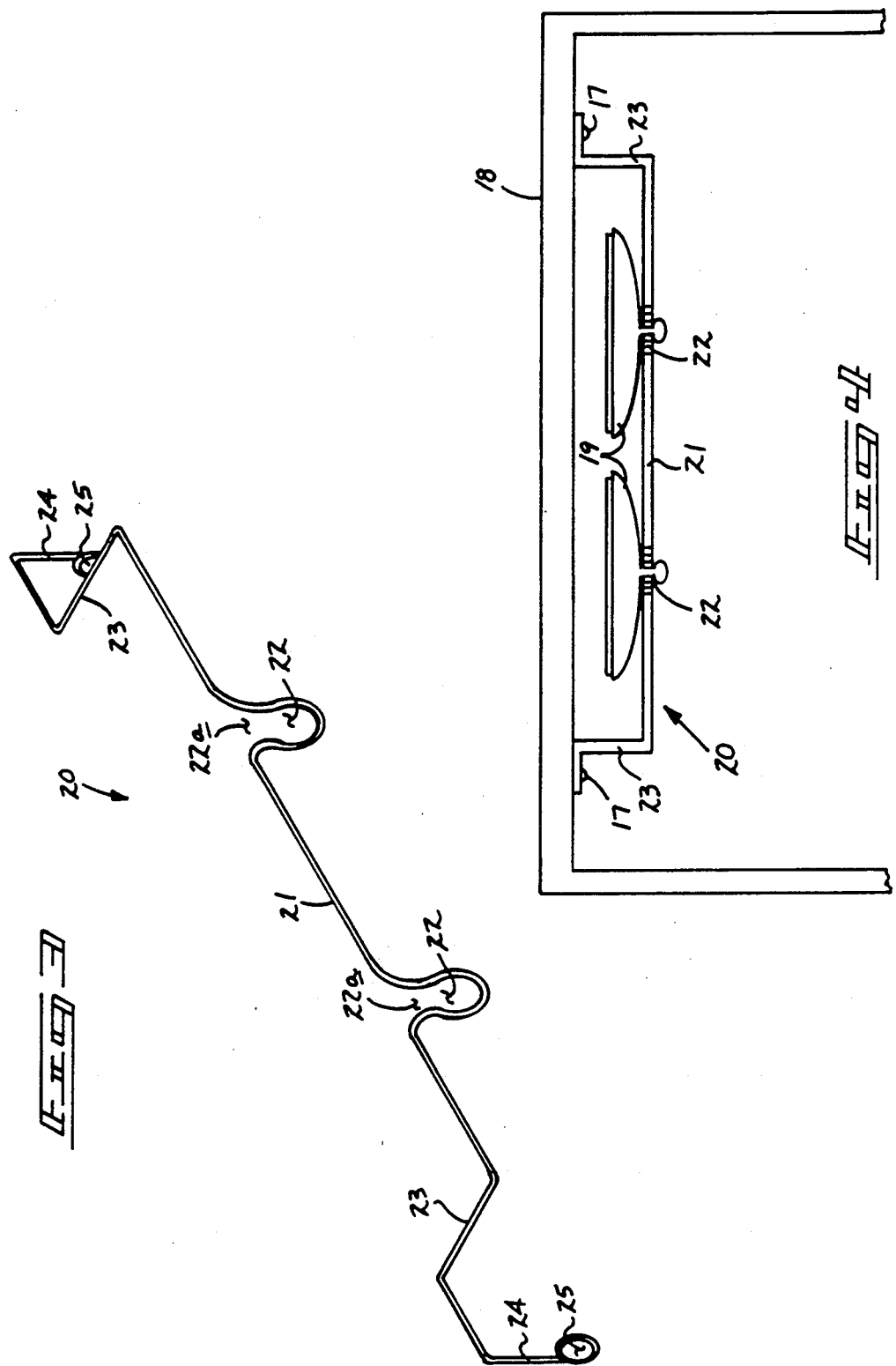

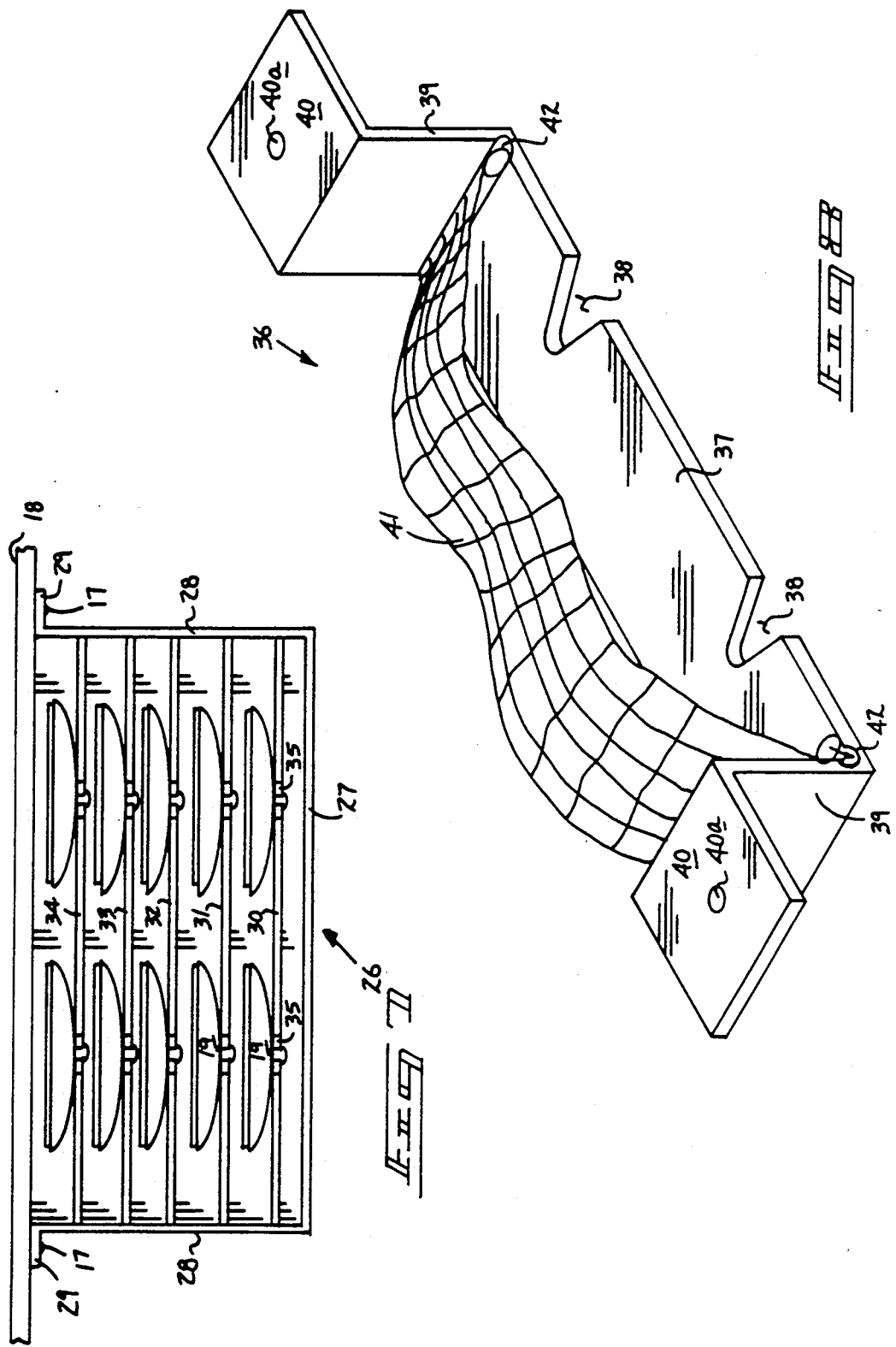

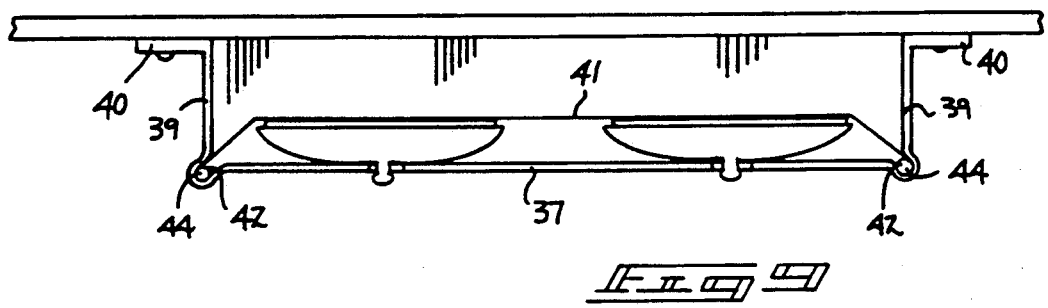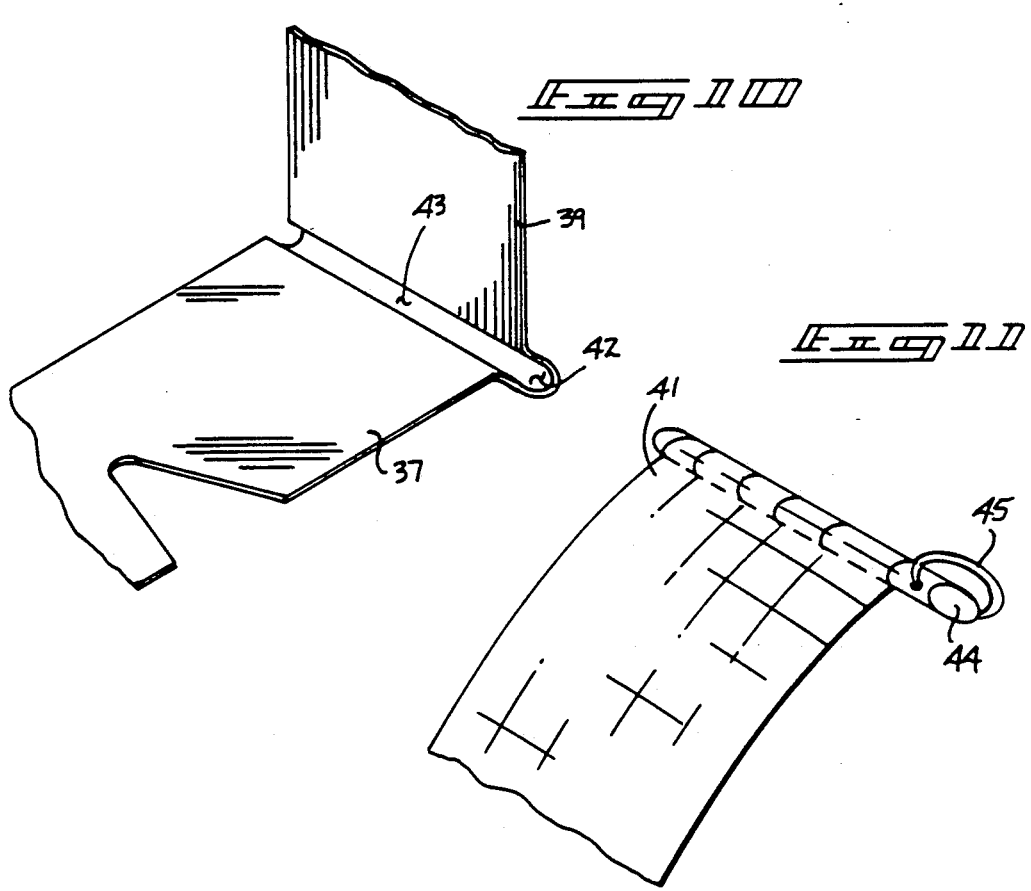

LID HOLDER RACK

BACKGROUND OF THE INVENTION

1. Field of the Invention

The field of invention relates to racks, and more particularly pertains to a new and improved lid holder rack wherein the same is conveniently secured to a vertical support surface for securement of a plurality of lids.

2. Description of the Prior Art

The prior art has utilized racks for securement of lids and various kitchen utensils. Racks of the prior art, however, have failed to provide the securement of such racks to a vertical support surface and for the express purpose of supporting lids thereon for their convenient and accessible use in a subsequent cooking procedure. Examples of the prior art include U.S. Pat. No. 4,592,471 to Bross setting forth a storage rack for dishes and the like that is positioned upon a horizontal support surface with grooves and upwardly projecting loops to maintain the kitchen items thereon.

U.S. Pat. No. 4,254,881 to Hard sets forth a shelf unit oriented for suspension from an underlying horizontal support surface utilizing various metallic loops secured upon the rack for securement of utensils thereon.

U.S. Pat. No. 3,465,892 to Taylor provides for a rack arranged for a slide-out relationship relative to a cabinet or the like in a drawer-like fashion provided with angulated legs for securement of utensils, such as dishes therein.

U.S. Pat. No. 4,776,469 to Geleziunas provides securement of lids wherein the rack provides a vertically oriented support base with angulated arms extending outwardly along either side of the base for securement of lids in an inclined relationship on the legs.

U.S. Pat. No. 3,454,019 to Leedy provides for a dish retaining rack utilizing flexible loops for securement of dishes on a horizontal support base.

As such, it may be appreciated that there is a continuing need for a new and improved lid holder rack wherein the same addresses both the problems of ease of use and effectiveness in construction and in this respect, the present invention substantially fulfills this need.

SUMMARY OF THE INVENTION

In view of the foregoing disadvantages inherent in the known types of kitchen racks now present in the prior art, the present invention provides a lid holder rack wherein the same is arranged for securement to a vertical support surface. As such, the general purpose of the present invention, which will be described subsequently in greater detail, is to provide a new and improved lid holder rack which has all the advantages of the prior art kitchen racks and none of the disadvantages.

To attain this, the present invention comprises a forward support bar including a plurality of spaced "V" shaped notches for receiving a shank portion of a lid arranged between the lid and an enlarged end of the shank. The bar includes a plurality of spaced side legs terminating in forward support legs arranged parallel to the support bar, the support legs formed with apertures therethrough for reception of respective fasteners for securement of the arrangement to a vertical support surface. A second embodiment of the invention includes a lid holder rack formed of a wire body structure with spaced recesses formed upon a forward linear wire portion arranged with generally "U" shaped recesses with a constricted neck portion for securement of the shank portions of the lid therein. A third embodiment of the invention includes a "U" shaped rack structure of solid construction formed with an interior series of parallel support bars spaced relative to one another for accommodation of a lid therein.

A fourth embodiment of the invention includes a forward planar support bar with "V" shaped notches formed therein with an elastomeric securement band to secure the lids in position against a rear surface of the support bar, as well as minimizing dust and debris from entering interior surfaces of the lid. The elastomeric band is secured by cylindrical pegs received within cylindrical grooves formed at intersections of side and forward surfaces of the apparatus.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lid holder rack which has all the advantages of the prior art kitchen racks and none of the disadvantages.

It is another object of the present invention to provide a new and improved lid holder rack which may be easily and efficiently manufactured and marketed.

It is a further object of the present invention to provide a new and improved lid holder rack which is of a durable and reliable construction.

An even further object of the present invention is to provide a new and improved lid holder rack which is susceptible of a low cost of manufacture with regard to both materials and labor, and which accordingly is then susceptible of low prices of sale to the consuming public, thereby making such lid holder racks economically available to the buying public.

Still yet another object of the present invention is to provide a new and improved lid holder rack which provides in the apparatuses and methods of the prior art some of the advantages thereof, while simultaneously overcoming some of the disadvantages normally associated therewith.

Still another object of the present invention is to provide a new and improved lid holder rack wherein the same is arranged for reception and securement of lids in a secure and convenient relationship relative to a vertical support surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a top orthographic view of the instant invention secured to a vertical support surface.

FIG. 3 is an isometric illustration of a second embodiment of the instant invention.

FIG. 4 is a top orthographic view of the second embodiment of the instant invention secured to a vertical support surface.

FIG. 7 is a top orthographic view of the third embodiment of the instant invention.

FIG. 8 is an isometric illustration of a fourth embodiment of the instant invention.

FIG. 9 is a top orthographic view of the fourth embodiment of the instant invention secured to a vertical support surface.

FIG. 10 is an isometric view taken in section of the securement groove of the fourth embodiment of the instant invention.

FIG. 11 is an isometric fragmentarial illustration of a detail illustrating the securement of the elastomeric band within the securement groove of the instant invention.

DESCRIPTION OF THE PREFERRED EMBODIMENT

Figure 5:
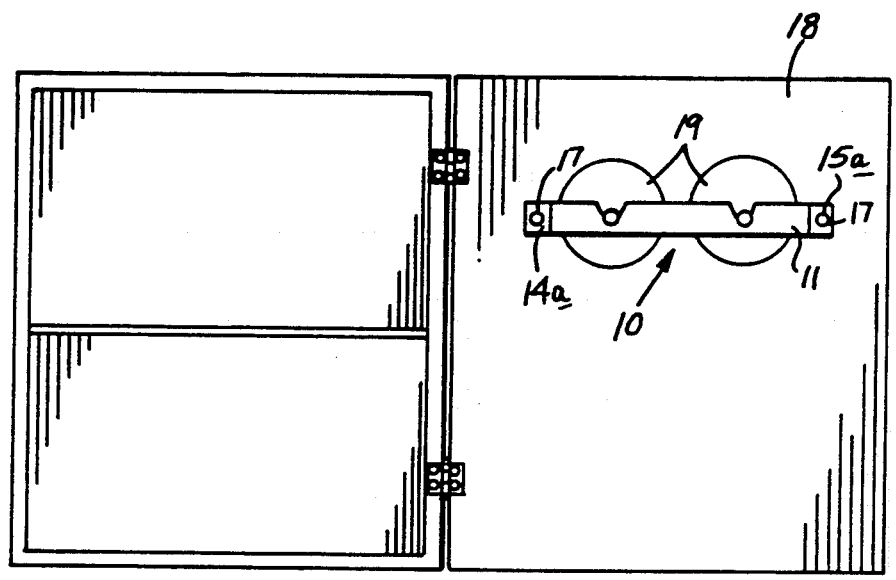
FIG. 5 is an orthographic view taken in elevation of the invention as illustrated in FIGS. 1 and 6 secured to a vertical support surface.

With reference now to the drawings, and in particular to FIGS. 1 to 13 thereof, a new and improved lid holder rack embodying the principles and concepts of the present invention and generally designated by the reference numerals 10, 20, 26, and 36 will be described.

More specifically, the lid holder rack 10 of the instant invention essentially comprises a forward planar support bar 11 formed with a plurality of spaced "V" shaped recesses 12 directed downwardly from a top bar edge 13 of the bar 11. Left and right legs 14 and 15 are orthogonally and integrally secured to the support bar 11 and are directed rearwardly thereof in a parallel manner relative to one another with left and right lower legs 14a and 15a respectively arranged and directed outwardly of the left and right side legs 14 and 15 parallel to the support bar 11 and formed with through-extending apertures therethrough for reception of fastener 17. FIG. 2 is illustrative of the lid holder rack 10 secured to a vertical wall of a cabinet structure 18 interiorly of the cabinet for securement of the lids 19 in a convenient organized manner for subsequent use as desired. The lids 19 are each formed of typical construction with a convex lid surface including a shank extending exteriorly and orthogonally relative to the lid surface with a bulbous or enlarged end at an outer terminal end of each shank to maintain the shank in a captured relationship between the enlarged end and the lid at a lowermost portion of a respective "V" notch.

FIG. 3 is illustrative of a second embodiment 20 of the lid holder rack of the instant invention. A forward linear wire member 21 has formed therein spaced recesses 22 of a generally "U" shaped configuration directed downwardly from the wire member 21 and formed with necked entrances 22a for resilient securement of the aforenoted shanks of the lids therein, as the wire of the lid holder rack 20 is formed of a memory retentent wire that is resilient, yet returns to its original configuration to maintain the shanks of the lid within the recesses 22 as they pass the neck entrances 22a. The wire member 21 includes spaced parallel "L" shaped side legs 23 directed rearwardly of the wire member 21 and includes downwardly extending support legs 24 orthogonally oriented relative to terminal ends of the side legs 23 and terminating with a lower end defining a lower aperture 25 with an axially center aligned with the axial center of the lowermost portions of the "U" shaped recesses 22 to assist in structural integrity of the lid holder rack 20 during support of lids positioned therein.

Figure 6:
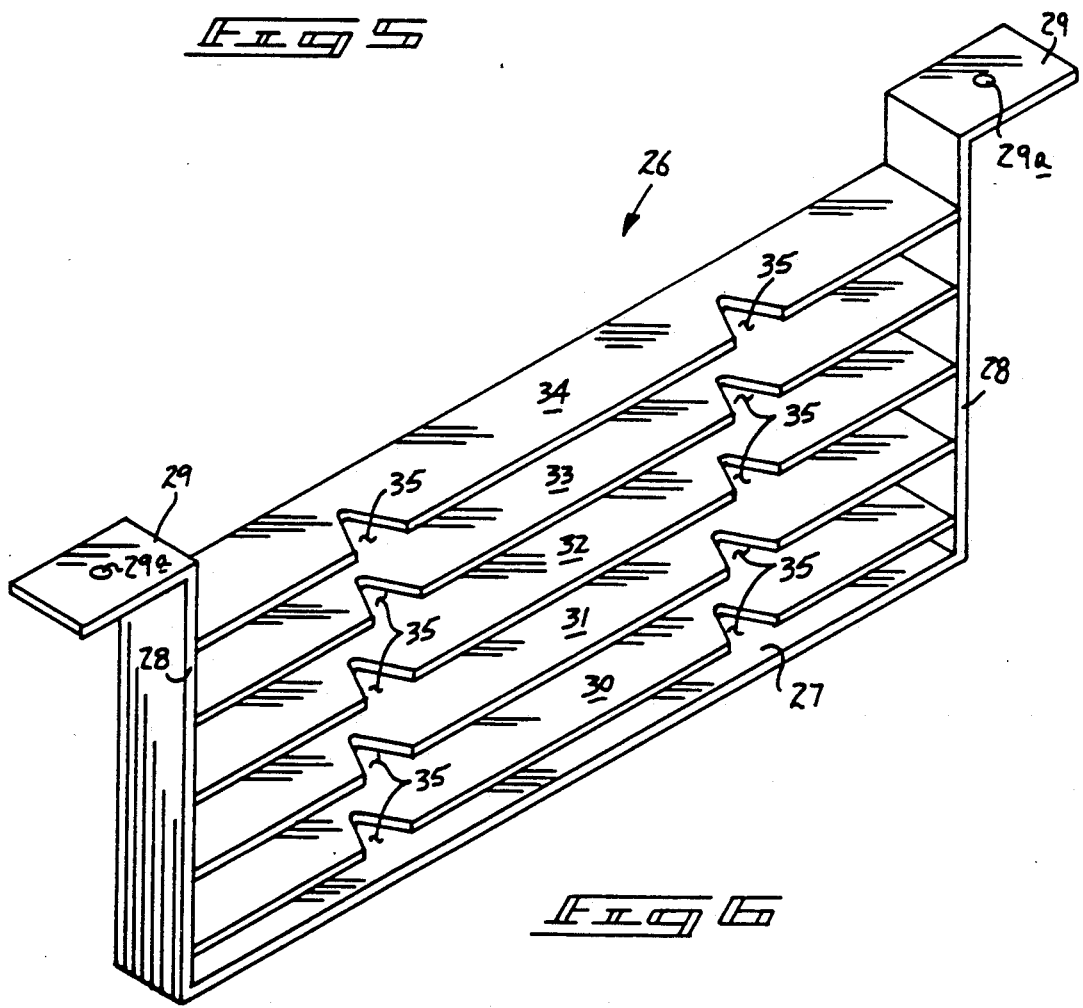
FIG. 6 is an isometric illustration of third embodiment of the instant invention.

FIG. 6 is illustrative of a third embodiment 26 of the lid holder rack. The lid holder rack 26 includes a solid planar forward support bar 27 free of recesses for protection of the lids positioned within the confines of the rack and to enhance structural integrity of the organization. Solid parallel side legs 28 are orthogonally and fixedly secured to outer terminal edges of the support bar 27, wherein the side legs 28 terminate in securement legs 29 directed exteriorly and orthogonally relative to the side legs 28 and parallel to the support bar 27 and are formed with apertures 29a for reception of fasteners therethrough. Positioned interiorly within the generally "U" shaped framework are a series of rack members 30, 31, 32, 33, and 34 defined as first, second, third, fourth, and fifth rack members, each formed with spaced and aligned "V" slots 35 directed interiorly of top edges of the respective rack members and are each integrally and orthogonally secured between side legs 28 and parallel to the forward bar 27 in a spaced relationship to accommodate plural pairs of lids 19 secured therein.

FIG. 8 is illustrative of a fourth embodiment 36 of the lid holder rack. The lid holder rack 36 includes a forward support bar 37 formed with spaced "V" shaped recesses 38 directed downwardly from a top edge of the forward support bar 37. Parallel side legs 39 are orthogonally and integrally secured to outer terminal edges of the forward support bar 37 and terminate within end legs 40 directed interiorly and orthogonally relative to the side legs 39 and parallel to the forward support bar 37. The end legs 40 include apertures 40a formed therethrough for reception of the fasteners 17 for securement to a respective cabinet or vertical support surface 18. An elastomeric band 41 is of a width substantially equal to or greater than the width of the forward support bar 37 to overlie the concave interior of a respective lid 19 and maintain such a lid in a secure relationship against a rear support surface of the forward support bar, as well as providing a dust covering to prevent dust and debris from entering interior surfaces of the lid. The elastomeric band 41 is secured to a support rod 44 at each terminal end thereof (see FIG. 11), with each support rod 44 terminating with a grasp ring 45 at an upper terminal end thereof spaced above a respective support band. The grasp rings enable manual securement for insertion and removal of elastomeric band for servicing or replacement of such bands relative to the framework of the lid holder rack 36. A cylindrical groove 42 is formed at each interior intersection of a side leg 39 and a respective terminal of the forward support bar 37, as illustrated in FIG. 10. The cylindrical groove 42 includes an elongate opening 43 of a width less than a diameter of a respective support rod 44 to maintain the support rods 44 in position interiorly of the respective grooves 42.

Figure 12:
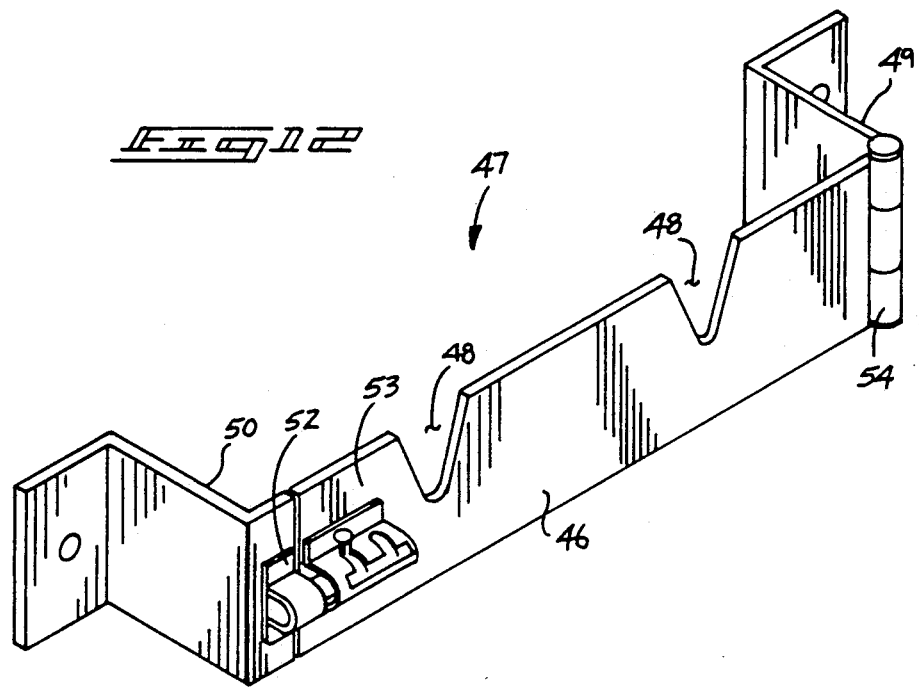
FIG. 12 is an isometric illustration of a fifth embodiment of the instant invention.
Figure 13:
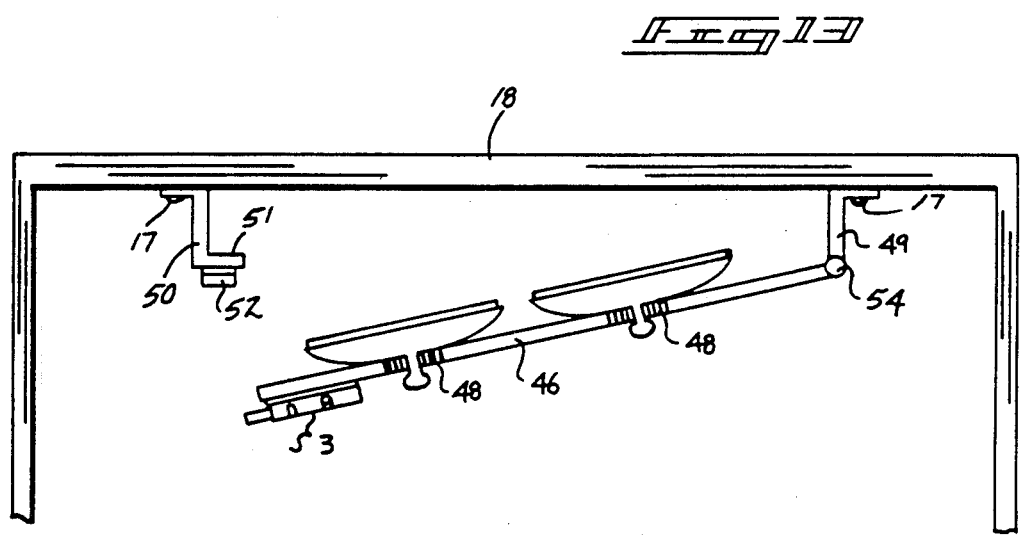
FIG. 13 is a top orthographic view of the fifth embodiment of the instant invention.

FIGS. 12 and 13 are illustrative of a fifth embodiment of the instant invention wherein a forward support bar 46 includes spaced "V" shaped grooves 48 formed by a top edge of the support bar 46 directed downwardly thereof. The fifth embodiment 47 includes a right "L" shaped securement bracket 49, and a left "S" shaped securement bracket 50, wherein a hinge 54 mounts a right-edge of the support bar 46 to the bracket 49, while a latch mechanism including a bolt receiving member 42 and a slide bolt mechanism 53 secure the "S" shaped bracket and the left edge of the support bar selectively together, whereupon release of the bolt mechanism 53 from the bolt receiving portion 52, the support plate 46 may be pivoted outwardly relative to the "S" shaped bracket 50, as illustrated in FIG. 13, to enable convenient access to lids mounted within the aforenoted "V" shaped grooves 48.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lid holder rack for securement of a lid defined by a central body with a shank directed outwardly and medially of the central body terminating in an enlarged end, the lid rack comprising,
    an elongate forward support member including a plurality of spaced recesses directed downwardly relative to an upper edge of the support member, and
    right and left side legs directed rearwardly of the support member and orthogonally and integrally secured to side edges of the support member and right and left securement legs including an aperture formed medially thereof directed through each securement leg with each securement leg orthogonally and integrally secured to each side leg and directed exteriorly of each side leg wherein each aperture is arranged for reception of a fastener therethrough for securement of the rack to a vertical support surface, and
    wherein each intersection of each side leg relative to the forward support member includes an elongate cylindrical groove coextensive with the intersection defined between each side leg and the forward support member and arranged at an apex defined by an intersection defined by interior surfaces of the forward support member and side legs, and securement means selectively mounted within each cylindrical groove for securement of lid members to the forward support member.

2. A lid holder rack as set forth in claim 1 wherein the securement means includes an elongate cylindrical rod receivable within each cylindrical groove, each cylindrical rod terminating at an upper end thereof with a grasp ring fixedly mounted at an upper end of each rod, and further including an elastomeric band fixedly secured to each rod, the elastomeric band extending between the side legs and of a width equal to or greater than a predetermined width defined by the forward support member.

3. A lid holder rack as set forth in claim 2 wherein each cylindrical groove includes an elongate coextensive opening permitting the elastomeric band to extend exteriorly of each cylindrical groove, and each opening is defined by an opening width less than a predetermined diameter defined by each cylindrical rod.

* * * * *